United States Patent [19]

Gautier et al.

[11] Patent Number: 5,012,998
[45] Date of Patent: May 7, 1991

[54] DEVICE FOR ASSEMBLING A SERVOMOTOR ON A VEHICLE BULKHEAD

[75] Inventors: Jean-Pierre Gautier; Pedro Verbo, both of Aulnay Sous Bois, France

[73] Assignee: Bendix France, Drancy, France

[21] Appl. No.: 439,076

[22] Filed: Nov. 20, 1989

[30] Foreign Application Priority Data

Nov. 30, 1988 [FR] France .................. 88 15678

[51] Int. Cl.⁵ ............................................. F16B 21/00
[52] U.S. Cl. .................. 248/225.2; 248/201; 92/161
[58] Field of Search .................. 248/225.2, 201, 205.1, 248/220.1; 403/380, 353, 410; 92/161, 128

[56] References Cited

U.S. PATENT DOCUMENTS

| | | | |
|---|---|---|---|
| 4,269,533 | 5/1981 | Mashiki et al. | 403/410 |
| 4,725,029 | 2/1988 | Herve | 92/128 X |
| 4,779,515 | 10/1988 | Staub | 92/161 X |
| 4,779,516 | 10/1988 | Parker et al. | 92/161 X |
| 4,784,046 | 11/1988 | Gautier | 92/161 X |
| 4,790,235 | 12/1988 | Gautier et al. | 92/161 X |
| 4,798,129 | 1/1989 | Staub | 92/161 X |
| 4,826,121 | 5/1989 | Rossigno et al. | 92/161 X |

Primary Examiner—David M. Purol
Attorney, Agent, or Firm—Larry J. Palguta; Ken C. Decker

[57] ABSTRACT

Assembly of a servomotor (10), such as a brake booster sevomotor, on a motor-vehicle bulkhead is performed by fixing, on the rear side of the srvomotor and on the bulkhed, two pairs of plates (16a, 16b; 18a, 18b) which project towards each other and are parallel with each other and with the axis of the servomotor. These plates are rigidly joined together by at least one screw/nut assembly, the nut (24a, 24b) of which is welded onto one of the plates and the screws (26a, 26b) of which pass through the plates in a direction perpendicular to the axis of the servomotor, the plates being accessible from the outside. Advantageously, the plates (16a, 16b) connected to the servomotor have at least one coupling member (20a, 20b) designed to cooperate with notches (22a, 22b) formed on the top edge of the plates (18a, 19b) connected to the bulkhead, in order to allow positioning of the servomotor relative to the latter.

11 Claims, 3 Drawing Sheets

DEVICE FOR ASSEMBLING A SERVOMOTOR ON A VEHICLE BULKHEAD

BACKGROUND OF THE INVENTION

The invention relates to a device enabling a servomotor, such as a brake booster servomotor, to be assembled in a particularly simple manner, for example with the aid of a robot, on a motor-vehicle bulkhead.

During the mass production of motor vehicles, the ease with which each of the parts forming this vehicle can be assembled is an important factor since a relatively small saving in time during the assembly of some of these components may result, at the end of the production line, in an appreciable increase in the output.

This ease of assembly is also significant when certain parts must be replaced during the life of a vehicle.

SUMMARY OF THE INVENTION

The object of the invention is precisely to provide a device for assembling a servomotor, such as a brake booster servomotor, on a vehicle bulkhead, this device being designed in a particularly simple and rational manner so as to allow, in particular, robotized assembly of the servomotor.

According to the invention, this object is achieved by means of a device for assembling a servomotor on the bulkhead separating an engine side and a passenger side of a vehicle, and comprising a support means and a means for locking the servomotor relative to the bulkhead, the servomotor being arranged on the engine side of the bulkhead and comprising a housing, a rear surface of which, substantially perpendicular to the axis of the servomotor, is located opposite the bulkhead. The support means includes a support element integral with the rear surface of the servomotor and cooperating with a complementary support element integral with the bulkhead, and the locking means, which is arranged on the engine side, ensures locking between the support elements and is accessible laterally on the engine side.

In a first preferred embodiment of the invention, the support elements consist of two pairs of plates which project towards each other and on either side of said axis, from the rear surface and the bulkhead respectively, the plates of each pair being arranged and spaced in such a way that one surface of each plate of a pair is in contact with a corresponding surface of each plate of the other pair.

Advantageously, in order to allow positioning of the servomotor on the vehicle bulkhead, before it is fixed, the support element integral with the rear surface comprises a coupling element cooperating with the support element integral with the bulkhead.

By way of a variation, the support elements may also consist of parts of revolution or coaxial parts with a polygonal cross-section.

Preferably, the support means also comprises a means for relative axial positioning of the support elements, such as a notch formed in one of these elements.

BRIEF DESCRIPTION OF THE DRAWINGS

Different embodiments of the invention will now be described, with reference to the accompanying drawings, in which.

DETAILED DESCRIPTION OF THE INVENTION

Figure 1:
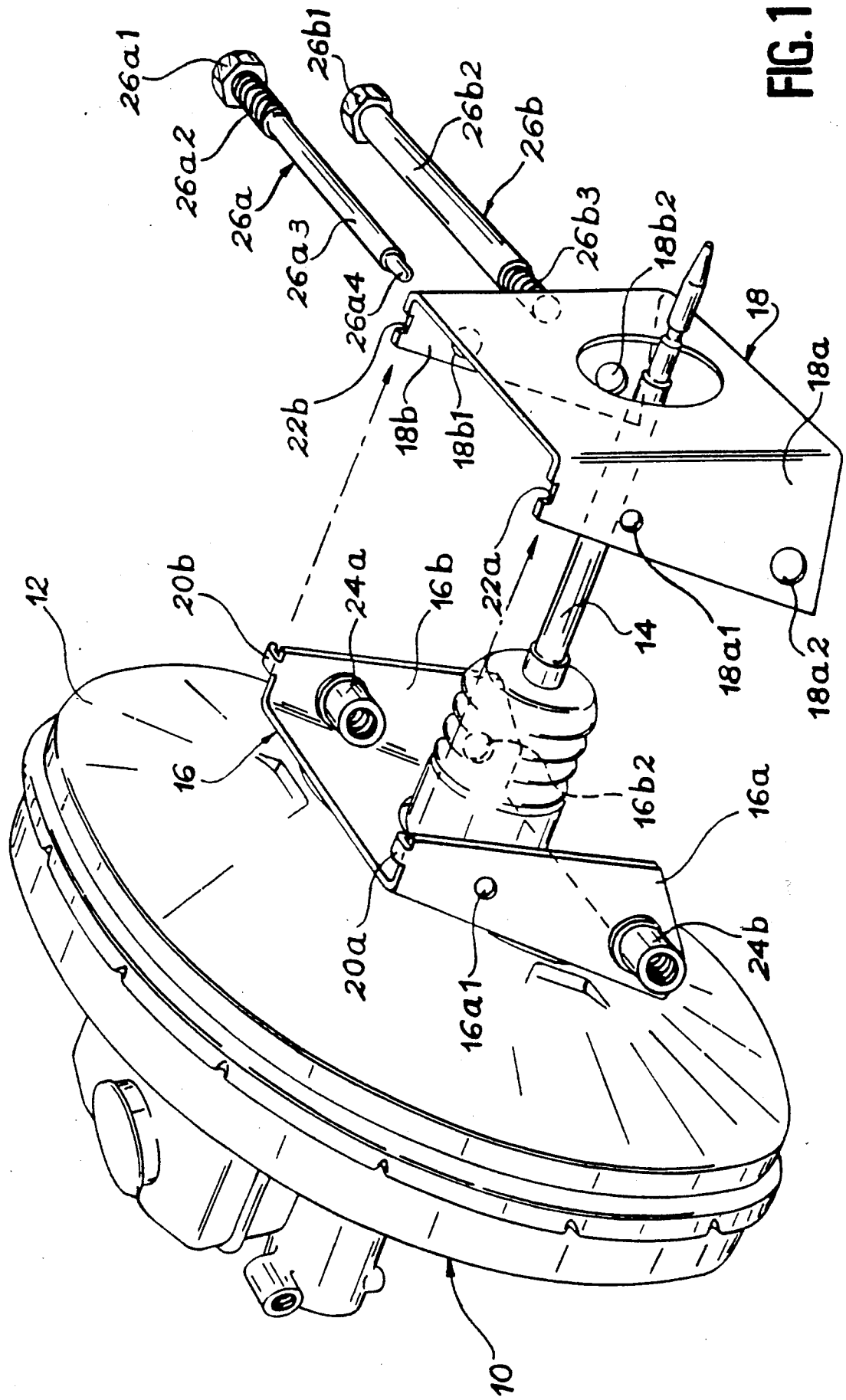
FIG. 1 is an exploded perspective view showing a first embodiment of a device for assembling a servomotor on a vehicle bulkhead according to the invention.

In FIG. 1, the reference number 10 denotes generally a brake booster servomotor. This servomotor, possessing a conventional design, comprises a housing 12 symmetrical in revolution about an axis coinciding with the axis of an actuating rod 14 of the servomotor, intended to be connected to the brake pedal (not shown) of the vehicle.

According to the invention, the surface of the housing 12 of the servomotor facing the rear of the vehicle, called the rear surface, supports on either side of the actuating rod 14 two flat plates 16a and 16b oriented so as to be parallel with each other and with the axis of the servomotor and projecting towards the rear from this rear surface. When the servomotor 10 is installed on the vehicle, these plates 16a and 16b are approximately vertical. In the example of embodiment shown in FIG. 1, the plates 16a and 16b are made from a single sheet, indicated generally by the reference number 16, folded so as to have the cross-sectional shape of a U, the end arms of which form the plates 16a and 16b. This sheet 16 is fixed onto the rear surface of the housing 12 via the middle section of the U, in which there is formed a circular passage through which pass the actuating rod 14 and a tubular part of the housing projecting towards the rear.

The assembly device according to the invention also comprises a second pair of parallel plates 18a and 18b fixed onto the bulkhead (not shown) of the vehicle, serving to separate inside the latter the engine compartment from the passenger compartment. The plates 18a and 18b are parallel with each other and project towards the front from the vehicle bulkhead, being arranged approximately vertically when the vehicle is in the horizontal position. In the embodiment shown in FIGS. 1 and 2, the distance between the plates 18a and 18b is the same as the distance between the plates 16a and 16b. Moreover, the plates 18a and 18b are formed from a single sheet 18, folded so as to form a U, the end arms of which form these plates and the middle section of which allows the part 18 to be fixed onto the vehicle bulkhead. In its central portion, the middle section of the part 18 also has a circular hole through which the actuating rod 14 of the servomotor 10 passes.

Figure 2:
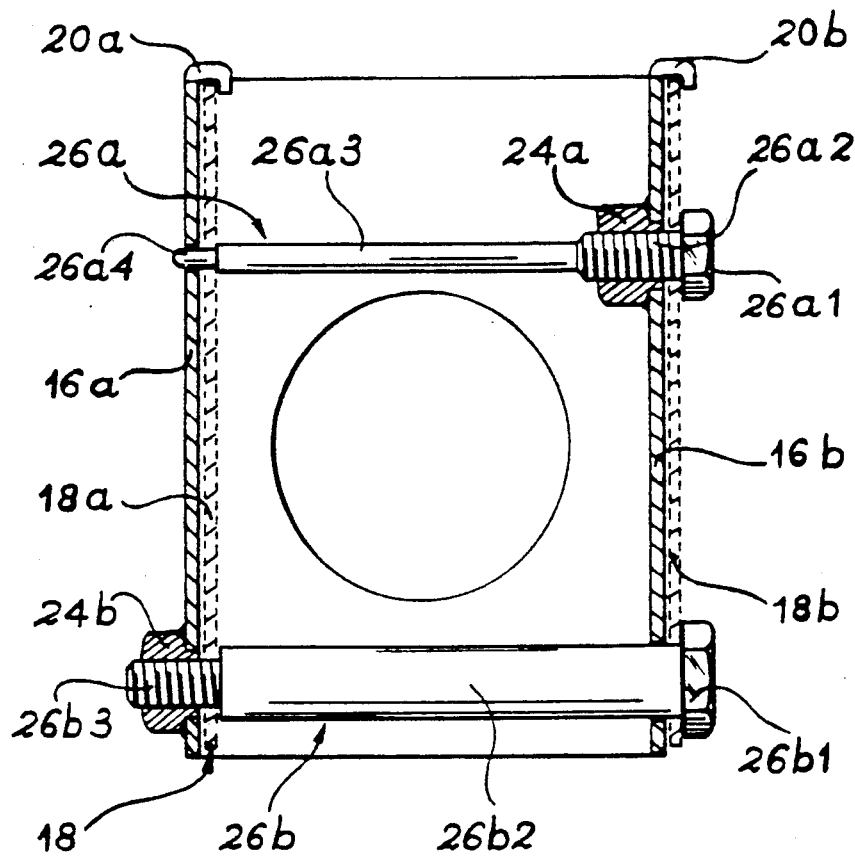
FIG. 2 is a sectional view of the assembly device of FIG. 1.

As FIG. 2 shows more clearly, the plates 16a and 16b connected to the housing of the servomotor 10 and the plates 18a and 18b connected to the vehicle bulkhead are intended to be arranged in such a way that the internal surface of the plate 16a is in contact with the external surface of the plate 18a, while the external surface of the plate 16b is in contact with the internal surface of the plate 18b.

In order to allow axial positioning of the servomotor 10 relative to the vehicle bulkhead, before positioning of the fixing means which will be described below, each of the plates 16a and 16b connected to the servomotor has a folded-back lug 20a, 20b, respectively, projecting from the top edge of these plates. These lugs 20a and 20b are folded back towards the inside and towards the outside, respectively, to form coupling elements capable of resting on complementary notches 22a, 22b formed in the plates 18a and 18b, respectively, connected to the vehicle bulkhead.

In the embodiment shown in FIGS. 1 and 2, fixing of the servomotor 10 onto the vehicle bulkhead is ensured by two screw/nut assemblies or systems arranged above and below the axis of symmetry of the servomotor, respectively.

A first of these screw/nut assemblies, arranged above the axis of symmetry of the servomotor, comprises a nut 24a welded onto the internal surface of the plate 16b and a screw 26a. The screw 26a passes in succession through the plates 18b, 16b, 18a and 16a and has a shape stepped from its head 26a1, which bears against the external surface of the plate 18b, as far as its end. More precisely, the screw 26a has a threaded part 26a2, adjacent to its head, which passes through a hole 18b1 formed in the plate 18b and which screws into the nut 24a, a middle section 26a3 with a diameter less than the minimum diameter of the threaded part 26a2, and an end part 26a4 with a diameter less than the diameter of the middle part 26a3. This end part passes through two holes with a reduced diameter 18a1, 16a1 formed in the plates 18a and 16a, respectively. When the head of the screw 26a bears against the external surface of the plate 18b, the shoulder formed between the middle part 26a3 and the end part 26a4 of this screw bears against the end plate 18a so as to press the latter against the plate 16a. The screw 26a thus acts as a spacer.

The second screw/nut assembly located below the axis of the servomotor 10 comprises a nut 24b welded onto the external surface of the plate 16a and a screw 26b. The latter passes in succession through the plates 18b, 16b, 18a and 16a. It also has a shape stepped from its head 26b1, which bears against the external surface of the plate 18b, as far as its end. More precisely, the screw 26b has a cylindrical middle part 26b2, which passes through holes 18b2, 16b2 formed for this purpose in the plates 18b and 16b, and a threaded end part 26b3 with a diameter less than the diameter of the cylindrical middle part 26b2. The threaded end part 26b3 of the screw 26 passes through a hole 18a2 formed for this purpose in the plate 18a and screws into the nut 24b. The shoulder formed between the cylindrical middle part 26b2 and the threaded end part 26b3 of the screw 26b bears against the internal surface of the plate 18a when the head of the screw bears against the external surface of the plate 18b. The screw 26b, therefore, also acts as a spacer.

As a result of the arrangement described above, assembly of the servomotor 10 on the vehicle bulkhead may be performed by a robot which initially positions the lugs 20a and 20b on the notches 22a and 22b and subsequently screws the screws 26a and 26b into the nuts 24a and 24b from the same side of the assembly, in particular owing to the orientation of the screw/nut assemblies passing through the plates in a direction perpendicular to the axis of the servomotor.

Figure 3:
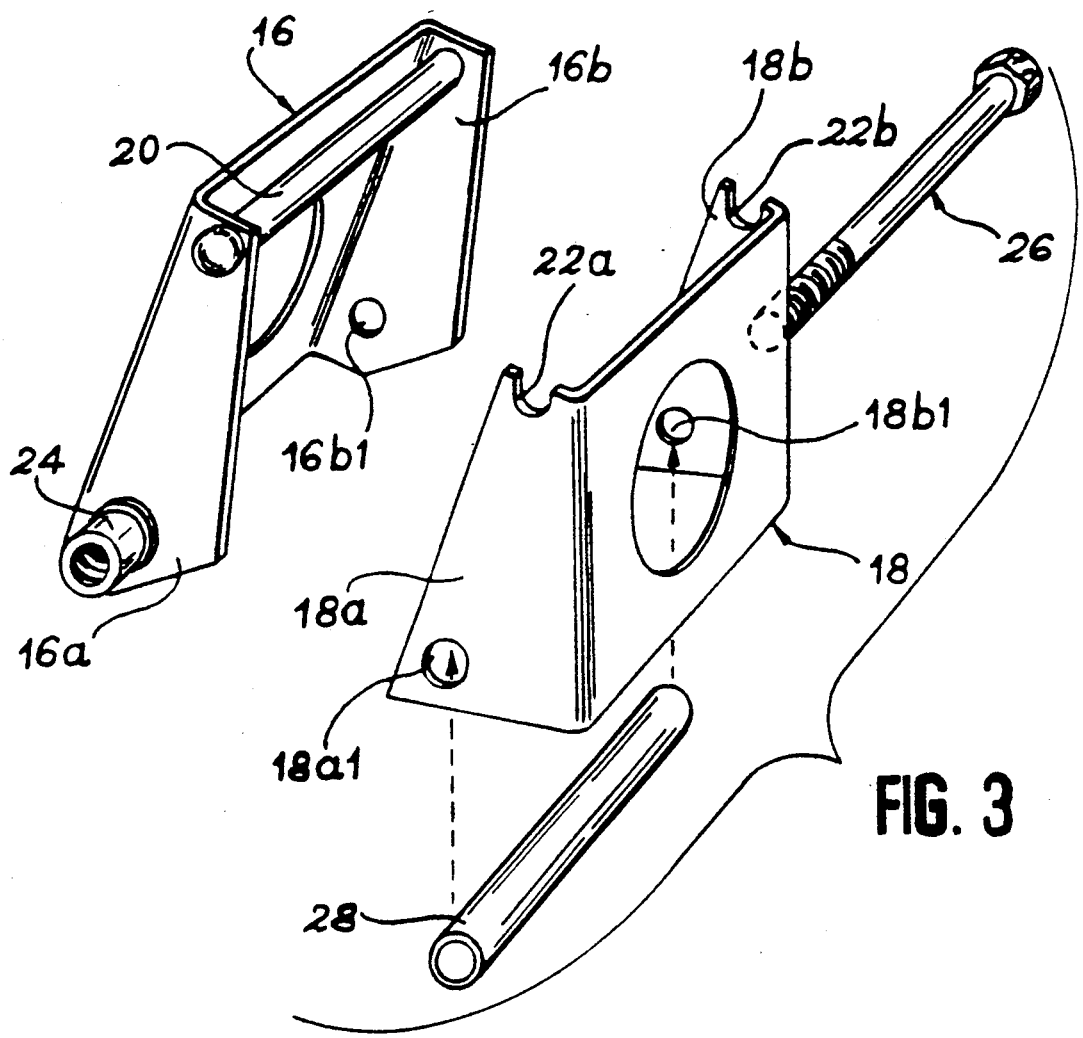
FIG. 3 is an exploded perspective view showing a second embodiment of the invention.
Figure 4:
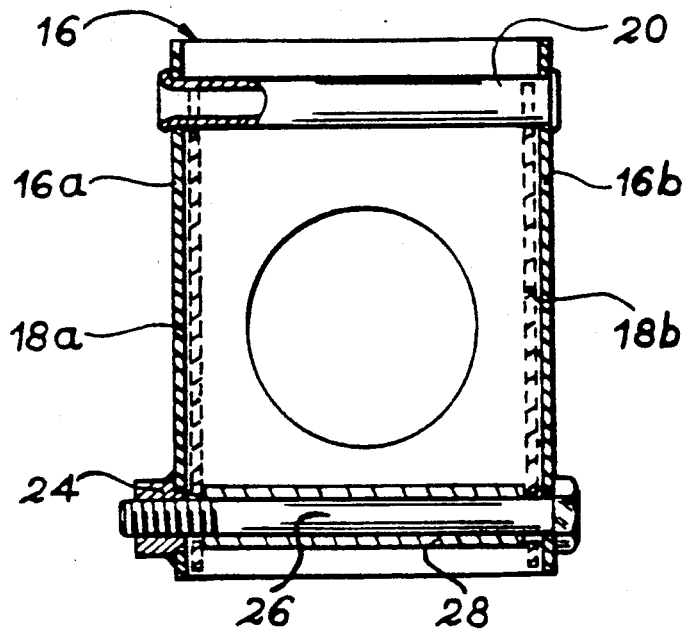
FIG. 4 is a sectional view of the assembly device of FIG. 3.

In a second embodiment shown in FIGS. 3 and 4, the rear surface of the servomotor also has mounted on it two plates 16a and 16b which are made from a single sheet 16 and the orientation of which is similar to that of the plates 16a and 16b of the first embodiment. Similarly, the vehicle bulkhead has mounted on it two parallel plates 18a and 18b which are made from a single plate 18 and oriented in the same manner as the plates 18a and 18b of the first embodiment.

A first difference from the first embodiment lies in the fact that the plates 16a and 16b connected to the servomotor are intended to position themselves on either side of the plates 18a and 18b connected to the vehicle bulkhead, the internal surfaces of the plates 16a and 16b being in contact with the external surfaces of the plates 18a and 18b, respectively. Consequently, the distance between the plates 18a and 18b is slightly less than the difference between the plates 16a and 16b.

A second difference from the first embodiment concerns the means enabling the servomotor to be positioned on the vehicle bulkhead before performing fixing thereof. In the embodiment shown in FIGS. 3 and 4, this positioning is performed by a single coupling member consisting of a rod 20, for example tubular in shape, joining the plates 16a and 16b in the vicinity of their top edge and oriented perpendicularly to these plates, so as to assume a horizontal position when the servomotor is mounted on the vehicle. In view of the cylindrical external shape of the rod 20, the notches 22a and 22b formed on the top edge of the plates 18a and 18b, respectively, have here the shape of an arc of a circle.

Another difference between the first and the second embodiments of the invention relates to the fact that, in this latter case, fixing of the servomotor on the vehicle bulkhead is performed by a single screw/nut assembly, arranged below the axis of the servomotor, which cooperates with the rod 20 accommodated in the notches 22a, 22b, so as to resist being pulled out. This screw/nut assembly has a nut 24, welded onto the external surface of the plate 16a, and a screw 26. When assembly is performed, the head of the screw 26 bears against the external surface of the plate 16b and the screw passes in succession through holes with the same diameter 16b1, 18b1, 18a1 formed in the plates 16b, 18b and 18a, before being screwed via its end into the nut 24. Moreover, in order to prevent the plates 18a and 18b connected to the vehicle bulkhead moving towards each other during fixing, a tubular spacer 28 is positioned between these plates, around the screw 26.

This embodiment shown in FIGS. 3 and 4 has substantially the same advantages as the embodiment shown in FIGS. 1 and 2.

Figure 5:
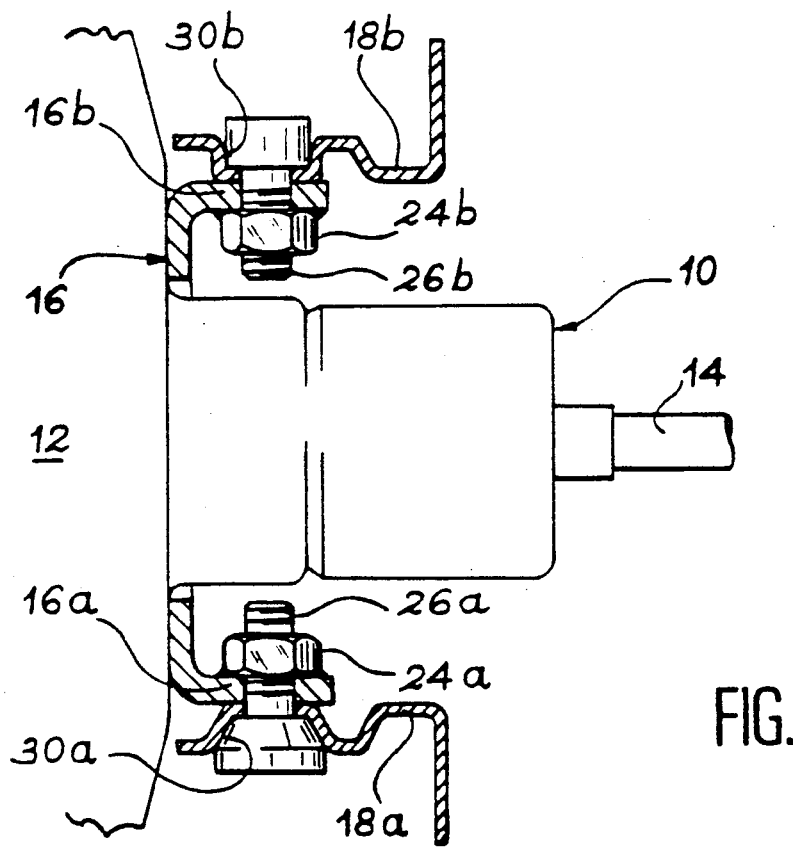
FIG. 5 is a sectional view along a horizontal plane illustrating a third embodiment of the invention, the top and bottom halves of this figure showing two variations of this embodiment.

In the third embodiment of the invention shown in FIG. 5, the servomotor also has mounted on its rear surface a pair of parallel projecting plates 16a and 16b which are formed from a single sheet 16 and the orientation of which remains unchanged with respect to the two preceding embodiments. As for the vehicle bulkhead, it has mounted on it two parallel plates 18a and 18b which project forwards so as to be able to position themselves on either side of the plates 16a and 16b. More precisely, when assembly is performed, the internal surfaces of the plates 18a and 18b are in contact with the external surfaces of the plates 16a and 16b, respectively.

This third embodiment of the invention differs essentially from the preceding ones in that fixing of the servomotor is no longer performed by the screw/nut assemblies passing in succession through the four plates, but by screw/nut assemblies passing through the adjacent plates 16a and 18a, and the adjacent plates 16b and 18b.

Thus, a first screw/nut assembly comprises a nut 24a which is welded onto the internal surface of the plate 16a and a screw 26a, the head of which bears against the external surface of the plate 18a and which passes through a hole formed in this plate so as to screw into the nut 24a.

Moreover, a second screw/nut assembly comprises a nut 24b welded onto the internal surface of the plate 16b and a screw 26b, the head of which bears against the external surface of the plate 18b and which passes through a hole formed in the latter before screwing into the nut 24b.

The screws 26a and 26b have hexagonal recessed heads with an external shape of revolution. The top half of FIG. 5 shows a first variation of embodiment in which the screw 26 has a head with a cylindrical external shape In this case, this head is advantageously accommodated in a complementary cylindrical recess 30b formed in the plate 18b, for example by means of pressing.

The bottom half of FIG. 5 shows another variation of embodiment in which the head of the screw 26a has a frustoconical shape. In this case, the plate 18a has on its external surface a frustoconical recess 30a with a shape complementing that of the head of the screw 26a. Advantageously, this recess is also formed by pressing.

Of course, the invention is not limited to the embodiments which have been described by way of example, but covers all variations thereof. It will be understood in particular that the various coupling systems described with reference in particular to FIGS. 1 and 3 may apply equally well to each of the three embodiments described. Similarly, in the first embodiment described, fixing of the servomotor may be performed either by a single screw/nut assembly or by two identical screw/nut assemblies. On the other hand, in the second embodiment, fixing may be performed by two screw/nut assemblies which may be either identical or different. It will also be understood that the parallel plates connected, on the one hand, to the servomotor and, on the other hand, to the vehicle bulkhead, may either be formed from a single sheet as described, or may be formed from two separate sheets, without departing from the scope of the invention.

Finally, if the various embodiments described use complementary support elements in the form of mutually parallel plates, it must be noted that these elements could assume different forms, without departing from the scope of the invention. Thus, they could consist of plates forming a given angle with the axis of the servomotor, of coaxial parts of revolution, or also of coaxial parts with a polygonal cross-section.

What we claim is:

1. A device for assembling a servomotor on a bulkhead separating an engine side and a passenger side of a vehicle, said servomotor being arranged on the engine side of said bulkhead and comprising a housing, and a rear surface substantially perpendicular to an axial axis of said servomotor and located opposite said bulkhead, said device comprising support means including a support element connected with the rear surface of said servomotor and cooperating with a complementary support element connected with said bulkhead, the support elements comprising two pairs of axial plates which project axially toward each other, from said rear surface and from said bulkhead, respectively, and on either side of said axial axis, each axial plate comprising a planar axial surface and arranged in such a way that the planar axial surface of each plate of one pair is in contact with a corresponding planar axial surface of a plate of the other pair.

2. The device according to claim 1, wherein said plates are parallel with each other.

3. The device according to claim 1, wherein the plates of each pair form a given angle with said axis.

4. The device according to claim 1, wherein said support element connected with said rear surface has a coupling element cooperating with said support element connected with said bulkhead.

5. The device according to claim 1, wherein said support means includes means for relative axial positioning of support elements.

6. The device according to claim 5, wherein said axial positioning means comprises a notch formed in one of said support elements.

7. The device according to claim 1, wherein the locking means comprises at least one screw and nut.

8. The device according to claim 7, wherein the screw provides a spacer for the support elements.

9. The device according to claim 7, wherein the screw is surrounded by a spacer.

10. The device according to claim 7, wherein said screw passes through only two plates of said support elements.

11. The device according to claim 7 wherein the nut is fixed onto the support element connected with said rear surface.

* * * * *